(12) United States Patent
Baxter et al.

(10) Patent No.: US 6,550,007 B1
(45) Date of Patent: Apr. 15, 2003

(54) BIOS-LEVEL FLOPPY BOOT-SECTOR VIRUS PREVENTION

(75) Inventors: Jay Ryan Baxter, Austin, TX (US); Marc David Alexander, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/490,940

(22) Filed: Jan. 25, 2000

(51) Int. Cl.$^7$ ................................................. G06F 9/00
(52) U.S. Cl. ......................................................... 713/2
(58) Field of Search ...................... 713/2, 200; 709/222

(56) References Cited

U.S. PATENT DOCUMENTS

| | | | | |
|---|---|---|---|---|
| 5,509,120 A | * | 4/1996 | Merkin et al. | 713/200 |
| 5,511,184 A | * | 4/1996 | Lin | 710/261 |
| 5,802,277 A | * | 9/1998 | Cowland | 713/200 |
| 5,822,582 A | * | 10/1998 | Doragh et al. | 709/321 |
| 6,282,641 B1 | * | 8/2001 | Christensen | 709/222 |

OTHER PUBLICATIONS

A. Padgett Peterson, "NoFBoot.doc", 1991.*

* cited by examiner

Primary Examiner—Thomas Lee
Assistant Examiner—Albert Wang
(74) Attorney, Agent, or Firm—Haynes and Boone, LLP

(57) ABSTRACT

A method and apparatus for implementing a BIOS-level floppy boot-sector virus prevention system. A floppy boot protection system installed on a computer system queries a user to indicate whether or not the computer system is to be booted from a floppy disk inserted in a floppy disk drive of the computer system prior to booting from the floppy disk. If the user responds in the affirmative, the computer system is booted from the floppy disk and operation proceeds as usual. If the user responds in the negative, the floppy disk boot is skipped, the user is advised of this fact, and the computer system attempts to boot from the next device listed in its boot table. In one aspect, during setup of the computer system, the user is able to enable or disable the floppy boot protection system as desired. If the user fails to respond to the query within a predetermined amount of time, the boot protection system defaults to skipping the floppy disk boot and proceeding as described above.

23 Claims, 2 Drawing Sheets

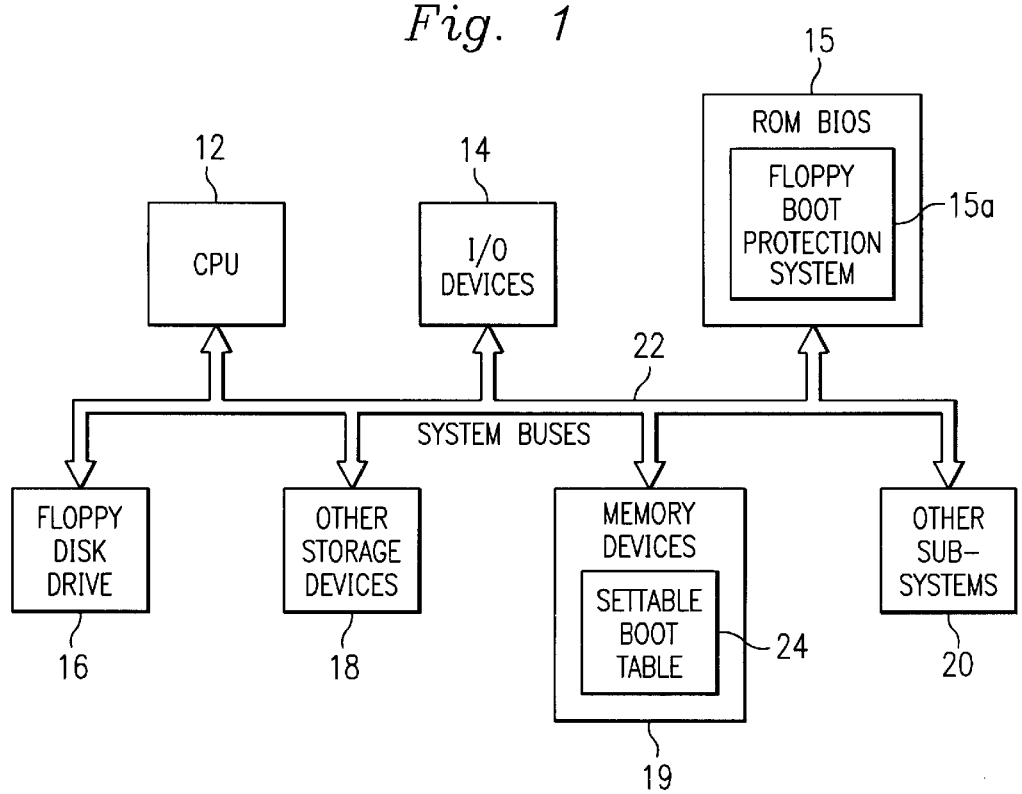

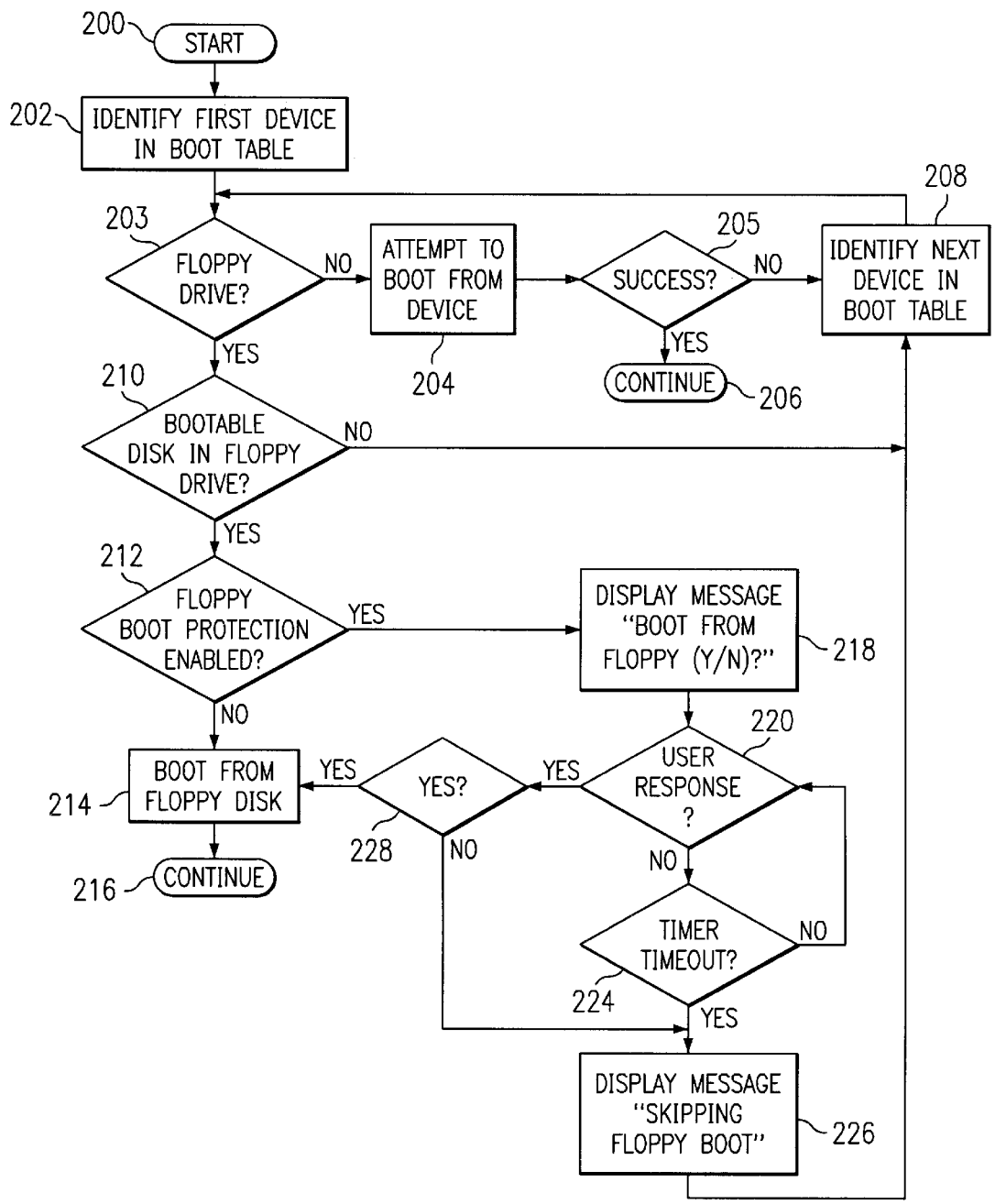

BIOS-LEVEL FLOPPY BOOT-SECTOR VIRUS PREVENTION

BACKGROUND

The disclosures herein relate generally to computer system virus protection and, more particularly, to a BIOS-level floppy boot-sector virus prevention system.

Computer system users often transfer data between computer systems using floppy disks, which are inserted into the floppy disk drive of the computer system to which the data is to be transferred. Frequently, the floppy disk is inadvertently left in the drive after the data transfer has been effectuated. If the disk is in the drive when the computer system is subsequently rebooted, the computer system will attempt to boot from the disk. In some cases, the floppy disk will be nonbootable or, if bootable, benign. In other cases, however, the floppy disk will be both bootable and infected with a computer virus that is spread by booting a computer system from the infected disk. One way to reduce the spread of computer viruses in this manner is to ensure that the user is aware of the presence of a floppy disk in a floppy disk drive and actually intends to boot the computer system therefrom. Often, this is not the case; rather, the user has inadvertently left the disk in the drive and is made aware of its presence only after the computer system boots from it.

One solution to the above-described problem is for the user to check the floppy disk drive for the presence of a disk each time he or she boots the computer system. This "solution" is of no use, however, in situations in which the computer system automatically boots or reboots itself, such as in cases where "wake-on-LAN," "wake-on-ring," and other features are implemented. In cases such as these, the user might not even be present when the computer boots itself and therefore cannot check the floppy disk drive and retrieve a potentially problematic disk therefrom before the boot process takes place.

Another solution to the problem is effectively to remove the option of booting from the floppy disk drive from the boot up process by moving the floppy disk drive to the bottom of the list of bootable devices contained in the selectable boot table of the computer system. This solution is deficient for several reasons, including the fact that a user may need to boot from a floppy disk from time to time, is not savvy enough to navigate the menus necessary to configure the computer system in this manner, and/or is prevented from doing so by corporate information systems/technology personnel.

Yet another solution to the problem is to wait until the computer system is actually infected with a virus and then use some type of third-party cleanup software to remove it. Clearly, however, preventing the problem is far preferable to curing it after it occurs.

Therefore, what is needed is a floppy boot protection system that alerts a user to the fact that the computer system is about to boot from the floppy disk drive before actually doing so, thus enabling the user to remove the floppy disk from the drive if the user does not intend the computer system to boot from the disk.

SUMMARY

One embodiment, accordingly, provides for implementing a BIOS-level floppy boot-sector virus prevention system. To this end, a method of implementing a BIOS-level floppy boot protection system for a computer includes detecting the presence of a bootable floppy disk in a floppy disk drive of the computer. A user is queried concerning whether to boot the computer from the floppy disk. A response to the query is received from the user. If the user responds in the affirmative, the computer is booted from the floppy disk. If the user responds in the negative, the computer is booted from another bootable device connected to the computer.

A technical advantage achieved is that the floppy boot protection system ensures that the user is aware and intends that the computer system is prepared to boot from a floppy disk inserted in a floppy disk drive of the computer before booting from the floppy disk.

Another technical advantage is that the floppy boot protection system prevents a user from accidentally booting from a floppy disk that might be infected with a virus.

Yet another technical advantage achieved is that the floppy boot protection system automatically defaults to skipping the floppy disk boot if the user is inattentive and fails to respond in the affirmative to a query concerning whether to boot from the floppy disk.

Yet another technical advantage achieved is that the floppy boot protection system can be selectively enabled/disabled by the user.

BRIEF DESCRIPTION OF THE DRAWING FIGURES

FIG. 1 is a system block diagram of an embodiment of a computer system for implementing a floppy boot protection system of one embodiment.

FIG. 2 is a flowchart of the operation of the floppy boot protection system of FIG. 1.

DETAILED DESCRIPTION

FIG. 1 is a system block diagram of a computer system 10 for implementing one embodiment. The computer system 10 includes a central processing unit (CPU) 12, input/output (I/O) devices, such as a display monitor, a keyboard, a mouse, and associated controllers, collectively designated by a reference numeral 14, and ROM BIOS 15 including code executable by the CPU 12 for implementing a floppy boot protection system 15a, as described below with reference to FIG. 2. The computer system 10 further includes a floppy disk drive 16 and other storage devices, such as one or more hard disk and/or CD-ROM drives, collectively designated by a reference numeral 18, various memory devices, collectively designated by a reference numeral 19, and various other subsystems, such as a network interface card (or NIC), modem, or timeout timer, collectively designated by a reference numeral 20. It will be recognized that all of the aforementioned elements of the computer system 10 are interconnected via one or more buses, which are represented in FIG. 1 by a bus 22. In the present example, the computer system 10 can be configured as a personal computer ("PC") running Microsoft DOS and/or WINDOWS. It should be understood, however, that the computer system 10 and its illustrated components are merely representative of many different types of computers and components well known and understood by those of ordinary skill in the art.

As will be recognized by those of ordinary skill in the art, the computer system 10 includes a selectable boot table 24 stored in one of the memory devices 19 that includes a list of bootable devices arranged in the order in which the computer system 10 is to attempt to boot from the devices. For example, the selectable boot table 24 may list the CD-ROM drive first, the floppy disk drive 16 second, and the hard disk drive third. In this instance, in normal operation, the computer system 10 will attempt to boot from the CD-ROM drive first, and, if that fails (e.g., if there is no CD-ROM in the CD-ROM drive), then from the floppy disk drive 16 and, if that fails (e.g., if there is no floppy disk in the floppy disk drive), then from the hard disk drive.

In the preferred embodiment, the floppy boot protection system 15a can be selectively enabled/disabled during setup of the computer system 10 in a manner that will be readily understood by one of ordinary skill in the art.

FIG. 2 is a flowchart of the operation of the embodiment of FIG. 1. Execution begins in step 200. In step 202, the boot table 24 is read and the first device in the boot table is identified. In step 203, a determination is made whether the identified device is the floppy disk drive 16. If not, execution proceeds to step 204, in which an attempt is made to boot from the identified device. In step 205, a determination is made whether the boot attempt was successful. If so, the normal computer system boot up processes are continued in step 206; otherwise, the next device in the boot table 24 is identified in step 208 and execution returns to step 203.

If in step 203 it is determined that the identified device is the floppy disk drive 16, execution proceeds to step 210, in which a determination is made whether a bootable floppy disk is present in the floppy disk drive 16. If not, execution proceeds to step 208; otherwise, execution proceeds to step 212, in which a determination is made whether the floppy boot protection system 15a has been enabled, as described above. If the floppy boot protection system 15a is not enabled, execution proceeds to step 214, in which the computer system 10 boots from the floppy disk drive 16, and then to step 216, in which the normal computer system boot up processes are continued in step 216.

Returning again to step 212, if it is determined that the floppy boot protection system 15a has been enabled, execution proceeds to step 218, in which a query is displayed prompting the user to indicate whether the computer system 10 should be booted from the floppy disk in the floppy disk drive 16 (e.g., "Boot to Floppy (Y/N)") and a countdown timer is set to timeout after a short (e.g., 5 seconds) time period. In step 220, a determination is made whether the user has responded to the query, either by entering a response (e.g., "Y" or "N"), or by removing the floppy disk from the floppy disk drive 16, thus preventing the computer system 10 from booting from the floppy disk. If the user has not responded, execution proceeds to step 224, in which a determination is made whether the timer set in step 218 has timed out. If not, execution returns to step 220; otherwise, execution proceeds to step 226, in which a message is displayed informing the user that the computer system will not be booted from the floppy disk in the floppy disk drive 16 (e.g., "Skipping Floppy Boot"), and then proceeds to step 208. Referring again to step 220, if it is determined that the user has responded to the query, execution proceeds to step 228, in which a determination is made whether the user has responded to the query in the affirmative. If so, execution proceeds to step 214, in which the computer system 10 boots from the floppy disk in the floppy disk drive 16; otherwise, execution proceeds directly to step 226.

In this manner, the floppy boot protection system 15a as described above prevents a user from accidentally or inadvertently booting from a floppy disk inserted in the floppy disk drive 16 by requiring that the user take some affirmative action, such as responding in the affirmative to a query, before the computer system 10 can be booted from the floppy disk. Accordingly, the floppy boot protection system 15a is especially useful in helping to prevent the spread of computer viruses that are spread by booting the computer system 10 from an infected disk.

Although an illustrative embodiment has been shown and described, a wide range of modification, change, and substitution is contemplated in the foregoing disclosure and in some instances, some features of the embodiment may be employed without a corresponding use of other features. Accordingly, it is appropriate that the appended claims be construed broadly and in a manner consistent with the scope of the embodiment disclosed herein.

What is claimed is:

1. A method of implementing a BIOS-level floppy boot protection system for a computer, the method comprising:

reading a boot table and identifying a first device in the boot table;

determining whether the first device is a floppy disk drive;

detecting the presence of a bootable floppy disk in the floppy disk drive of the computer;

determining whether a floppy boot protection system is enabled;

querying a user concerning whether to boot the computer from the floppy disk;

determining whether the user has responded to the query;

responsive to an affirmative response to the query, booting the computer from the floppy disk; and responsive to a negative response to the query, booting the computer from another bootable device connected to the computer.

2. The method of claim 1 further comprising:

responsive to the expiration of a predetermined period of time between said querying and said receiving, booting the computer from another bootable device connected to the computer.

3. The method of claim 1 further comprising:

substantially contemporaneously with the querying, setting a timer to expire after a predetermined period of time; and responsive to said timer expiring prior to receipt of a response to the query, booting the computer from another bootable device connected to the computer.

4. The method of claim 1 further comprising:

prior to booting the computer from another bootable device connected to the computer, advising the user that the computer will not be booted from the floppy disk.

5. The method of claim 1 wherein the step of querying is performed by displaying a message to the user via a display monitor of the computer.

6. The method of claim 4 wherein the step of advising is performed by displaying a message to the user via a display monitor of the computer.

7. The method of claim 1 wherein the negative response comprises removal of the floppy disk from the floppy disk drive.

8. The method of claim 1 wherein the received response is provided by the user using an input device of the computer.

9. A system for implementing a BIOS-level floppy boot protection system on a computer, the system comprising:

means for reading a boot table and identifying a first device in the boot table;

means for determining whether the first device is a floppy disk drive;

means for detecting the presence of a bootable floppy disk in the floppy disk drive of the computer;

means for determining whether a floppy boot protection is enabled;

means for querying a user concerning whether to boot the computer from the floppy disk;

means for determining whether the user has responded to the query;

means responsive to an affirmative response to the query for booting the computer from the floppy disk; and means responsive to a negative response to the query for booting the computer from another bootable device connected to the computer.

10. The system of claim 9 further comprising:

means responsive to the expiration of a predetermined period of time between said querying and said receiving for booting the computer from another bootable device connected to the computer.

11. The system of claim 9 further comprising:

means for setting a timer to expire after a predetermined period of time substantially contemporaneously with the querying; and means responsive to said timer expiring prior to receipt of a response to the query for booting the computer from another bootable device connected to the computer.

12. The system of claim 9 further comprising:

means for advising the user that the computer will not be booted from the floppy disk prior to booting the computer from another bootable device connected to the computer.

13. The system of claim 9 wherein the means for querying comprises a message displayed on a display monitor of the computer.

14. The system of claim 12 wherein the means for advising comprises a message displayed on a display monitor of the computer.

15. The system of claim 9 wherein the negative response comprises removal of the floppy disk from the floppy disk drive.

16. The system of claim 9 wherein the received response is provided by the user using an input device of the computer.

17. A computer program product comprising:

a computer program processable by a computer system for causing the computer system to:

read a boot table and identifying a first device in the boot table;

determine whether the first device is a floppy disk drive;

detect the presence of a bootable floppy disk in a floppy disk drive of the computer;

determine whether a floppy boot protection system is enabled;

query a user concerning whether to boot the computer from the floppy disk;

determine whether the user has responded to the query;

boot the computer from the floppy disk responsive to an affirmative response to the query; and boot the computer from another bootable device connected to the computer responsive to a negative response to the query; and the computer system processing the computer program for implementing a BIOS-level floppy boot protection system.

18. The computer program product of claim 17 wherein the computer program further causes the computer system to:

set a timer to expire after a predetermined period of time substantially contemporaneously with the querying; and boot the computer from another bootable device connected to the computer responsive to said timer expiring prior to receipt of a response to the query.

19. The computer program product of claim 17 wherein the computer program further causes the computer system to advise the user that the computer will not be booted from the floppy disk prior to booting the computer from another bootable device connected to the computer.

20. The computer program product of claim 17 wherein the querying is performed by displaying a message to the user via a display monitor of the computer.

21. The computer program product of claim 19 wherein the advising is performed by displaying a message to the user via a display monitor of the computer.

22. The computer program product of claim 17 wherein the negative response comprises removal of the floppy disk from the floppy disk drive.

23. The computer program product of claim 17 wherein the received response is provided by the user using an input device of the computer.

* * * * *